United States Patent
Nordin et al.

(10) Patent No.: US 8,009,610 B2
(45) Date of Patent: Aug. 30, 2011

(54) COMMUNICATION PLATFORM AND METHOD FOR PACKET COMMUNICATION BETWEEN A SERVICE PROVIDER AND A RADIO COMMUNICATION DEVICE

(75) Inventors: Andreas Nordin, Stockholm (SE); Daniel Malmkvist, Stockholm (SE); Gustav Söderström, Bromma (SE); Johan Edlund, Uppsala (SE); Johan Gertéll, Stockholm (SE); Martin Holst Swende, Skarholmen (SE); Thomas Backelin, Stockholm (SE)

(73) Assignee: Yahoo! Inc., Sunnyvale, CA (US)

( * ) Notice: Subject to any disclaimer, the term of this patent is extended or adjusted under 35 U.S.C. 154(b) by 997 days.

(21) Appl. No.: 11/571,396

(22) PCT Filed: Jun. 15, 2005

(86) PCT No.: PCT/SE2005/000920
§ 371 (c)(1),
(2), (4) Date: Sep. 6, 2007

(87) PCT Pub. No.: WO2006/004487
PCT Pub. Date: Jan. 12, 2006

(65) Prior Publication Data
US 2008/0045203 A1 Feb. 21, 2008

(30) Foreign Application Priority Data
Jun. 30, 2004 (SE) .................... 0401684

(51) Int. Cl.
*H04W 4/00* (2009.01)
(52) U.S. Cl. ............... 370/328; 455/432.1; 455/432.3; 455/433
(58) Field of Classification Search ............ 370/338, 370/352; 455/432.1, 432.3, 433, 434, 435.1, 455/435.2
See application file for complete search history.

(56) References Cited

U.S. PATENT DOCUMENTS

| | | | | |
|---|---|---|---|---|
| 6,359,880 | B1 * | 3/2002 | Curry et al. | 370/352 |
| 6,894,994 | B1 * | 5/2005 | Grob et al. | 370/335 |
| 6,920,487 | B2 * | 7/2005 | Sofer et al. | 709/218 |

(Continued)

FOREIGN PATENT DOCUMENTS

EP 05752601.4 3/2007

(Continued)

OTHER PUBLICATIONS

Provisional U.S. Appl. No. 60/868,321, filed Dec. 1, 2006.

(Continued)

*Primary Examiner* — Temica M Beamer
(74) *Attorney, Agent, or Firm* — Frommer Lawrence & Haug LLP; John W. Branch

(57) ABSTRACT

The present invention relates to a communication platform for packet communication between at least one service provider in a first network and a radio communication device in a second network, the second network comprises a first network node provided to, at least partly, handle communication between the radio communication device and a gateway located in the second network. The gateway is provided to handle communication between the second network and the communication platform, and the communication platform is provided to collect first data information relating to the radio communication device and second data information relating to a service provider application connected to the radio communication device through the communication platform. The communication platform is further provided to relate the first and second data information to each other to generate a user record specifying usage characteristics for usage of the service provider application by the radio communication device.

17 Claims, 5 Drawing Sheets

U.S. PATENT DOCUMENTS

| | | | |
|---|---|---|---|
| 6,975,852 B1 * | 12/2005 | Sofer et al. | 455/408 |
| 7,039,404 B2 * | 5/2006 | Das et al. | 455/435.1 |
| 2002/0138622 A1 | 9/2002 | Dorenbosch et al. | |
| 2003/0083990 A1 | 5/2003 | Berg et al. | |
| 2003/0126074 A1 | 7/2003 | Klatt et al. | |
| 2003/0229595 A1 | 12/2003 | Mononen et al. | |
| 2006/0085419 A1 | 4/2006 | Rosen | |
| 2006/0161599 A1 | 7/2006 | Rosen | |

FOREIGN PATENT DOCUMENTS

| | | |
|---|---|---|
| EP | 05752674.1 | 3/2007 |
| WO | PCT/SE05/00920 | 1/2006 |

OTHER PUBLICATIONS

Utility U.S. Appl. No. 11/571,391, filed Dec. 28, 2006.

* cited by examiner

COMMUNICATION PLATFORM AND METHOD FOR PACKET COMMUNICATION BETWEEN A SERVICE PROVIDER AND A RADIO COMMUNICATION DEVICE

TECHNICAL FIELD

The present invention relates to a communication platform for supporting communication between a service provider and a radio communication device using packet communication and a method therefore. More specifically the present invention relates to a communication platform for enabling billing of service provider application usage by a radio communication device and a method therefore.

BACKGROUND OF THE INVENTION

In present day radio communication systems, new radio devices become more and more intelligent and are introduced side-by-side with older radio devices still serving a large community.

The communication capabilities of these radio communication devices are ever increasing and data packet communication is today commonplace, using for instance GPRS (General Packet Radio System). Data communication protocols used by radio communication devices, more specifically cellular radio communication devices, are, among others WAP 1.0 (Wireless Application Protocol), WAP 1.1, WAP 2.0, HTTP (HyperText Transfer Protocol), HTTPS, TCP (Transport Control Protocol), IP (Internet Protocol) etc., where many cellular devices give access to only one or a few of these protocols.

Parallel with the development of more intelligent radio devices are the development of more and more intelligent and demanding services for these radio devices. Since so many different devices are out on the market a service provider oftentimes need to develop a specific service only towards a specific subset of the available radio devices. Not always because the other devices are not capable of handling the service, although this will of course also be the case in many situations, but also since the development cost would soar when the service need to be adapted to the capabilities of the different radio devices.

It would thus be beneficial if a solution could be provided that would reduce development cost for service providers and increase the consumer base.

Another problem relating to this issue is the possibility for a service provider to charge for the usage of the service provider application. The service provider has no immediate means of knowing who is using the service, other than requiring logon using password with an earlier registration. Further more the service provider would have to find ways to charge for the usage of the service, possibly with the added complexity of sending separate bills.

It would thus be of significant interest if a solution could be provided that supported billing of radio communication device users for usage of service provider applications.

Another problem in modern radio packet communication networks is the incapability for a service provider to initiate communication towards a radio communication device. Although this has sound reasons in terms of security, many valuable services, such as instant messaging and pushing of live content such as sport results, stock quotes etc, can not be developed without this capability. An additional problem in this respect is that telecommunication operators commonly provides the gateways between intranet and extranet with NAT (Network Address Translation) to increase security. This scheme hides any address information of the radio devices from the service providers, thus increasing the difficulty in establish connections from the service providers to the radio communication devices.

For TCP-based connections, the TCP protocol provides means for determining start and stop of the transaction, thus enabling the NAT-server to set up mapping between an external IP-address and an internal IP-address when an transaction is started, as well as tearing down an established mapping when the transaction finish. The UDP (User Datagram Protocol) protocol is often used for broadcasting applications, but since the UDP protocol is state-less it provides no means for the NAT-server to know when a transaction starts and stops, and therefore mapping between external and internal IP-address is difficult. Thus, the UDP-protocol is often blocked, and is not available for service provider applications.

It would therefore be beneficial if a solution could be found which allowed usage of the UDP-protocol for sending information between a service provider application and a radio communication device.

SUMMARY OF THE INVENTION

It is a main object of the present invention to provide such apparatus and method that at least alleviate the above problems. These objects among others are, according to a first aspect of the present invention, attained by a communication platform for packet communication between at least one service provider in a first network and a radio communication device in a second network, the second network comprises a first network node provided to, at least partly, handle communication between the radio communication device and a gateway located in the second network. The gateway is provided to handle communication between the second network and the communication platform, and the communication platform is provided to collect first data information relating to the radio communication device and second data information relating to a service provider application connected to the radio communication device through the communication platform. The communication platform is further provided to relate the first and second data information to each other to generate a user record specifying usage characteristics for usage of the service provider application by the radio communication device.

These objects among others are, are according to a second aspect of the present invention, attained by a method for packet communication between a service provider located in a first network and a radio communication device in a second network, the second network comprises a first network node provided to, at least partly, handle communication between the radio communication device and a gateway, and the gateway is provided for handling communication between the first network node and the first network. The method comprises the steps: —collecting first data information relating to the radio communication device, —collecting second data relating to a service provider application connected to the radio communication device, —relating the first data information to the second data information, and —generating a user record specifying usage characteristics for usage of the service provider application by the radio communication device.

By collecting first data about the radio communication device and second data relating to the service provider application and relating these to each other it is possible to connect usage of a service to the radio device or owner of the device. Thereby it is possible to charge the owner of the radio device for the usage of the service. Further more this complexity is handled by the communication platform, so that service provider need not consider these issues during development of a new service.

According to one variant of the invention the communication platform is provided to establish a first communication channel between the radio device and the communication platform upon request, and a second communication channel between the service provider application and the communication platform upon request. The communication platform is further provided to relate the first and second communication channel to create a connection between the radio communication device and the service provider application.

By this arrangement the communication platform will have complete information regarding to usage by a specific radio communication device of a specific service provider application. Thus, the communication platform can collect any data necessary to generate required billing information.

According to another variant of the invention the communication platform is connected to a data register in the second network.

By connecting the communication platform to a data register in the second network, that is the PLMN (Public Land Mobile Network) network, the communication platform will have access to radio communication device data. It will also be possible for the communication platform to generate billing information and send this to the data register so that the radio device can be billed using the already established billing method used by the PLMN operator.

According to another variant of the invention the data register is a Home Location Register or a Home Subscriber Server.

According to another variant of the invention the communication platform is provided to send the user record to the data register and the data register is provided to use the user record for generating billing information for billing the radio communication device user for the usage of the service provider application.

If the data register in the second network is used for billing purposes, there is no need to implement specific billing functionality in the communication platform. Transfer of billing information may use the diameter protocol, signalling system No. 7 or the radius protocol for communication with HSS, HLR etc.

According to another variant of the invention the user record is provided to be used for billing the radio communication device user for the usage of the service provider application.

According to another variant of the invention the first data are data selected from a group of data comprising: —Mobile Station Information including IMSI (International Mobile Subscriber Identity) and MSISDN, —Location information including ISDN number to the VLR (Visiting Location Register) and MSC (Mobile Services Switching Center) where the radio device is located, —Service information including service subscription and service restrictions, —SS7 address to the SGSN used by the radio device, —IP address to the SGSN used by the radio device, —MNRG, —a list of nodes disclosing available GGSN, —PDP context including: PDP (Packet Data Protocol) type, PDP address, QoS (Quality of Service) Profile, VPLMN (Visited Public Land Mobile Network) address, GGSN address for this context.

According to another variant of the invention the second data are data selected from a group of data comprising: service provider application identity, connection time, log on time, log off time, number of packets sent, number of packets received, amount of data sent or received, socket ID, IP-address, QoS, downloaded files, visited pages.

According to another variant the second aspect of the invention comprises the further steps of: —receiving a request for a communication channel between the radio communication device and the communication platform, —establishing a first communication channel between the radio communication device and the communication platform, —receiving a request for a communication channel between the communication platform and the service provider application, —establishing a second communication channel between the communication platform and the service provider application, and —relating the first communication channel to the second communication channel to create a connection between the radio communication device and the service provider application.

These objects among others are, according to a third aspect of the present invention, attained by a communication platform for packet communication between at least one service provider in a first network and a radio communication device in a second network, the second network comprises a first network node provided to, at least partly, handle communication between the radio communication device and a gateway located in the second network, the second network comprises a network address translation functionality translating a set of public IP-addresses, disclosed to the first network, to a set of private IP-addresses used in the second network for TCP-based communication between the first and second network. The communication platform is provided to receive a request for UDP communication from a service provider application located in the first network to the radio communication device, and to set up a mapping from the public IP-addresses to the private IP-addresses for UDP communication between the service provider application and the radio communication device in the network address translation functionality.

Thereby, it is possible to offer service provider applications UDP communication to radio communication devices. Thus, streaming applications can be developed.

According to one variant of the third aspect of the invention the communication platform is provided to receive the request using a control channel established between the service provider application and the communication platform.

The communication platform uses the control channel to receive a request for UDP communication. The service provider application is connected to the communication platform using the control channel as is described above.

According to one variant of the third aspect of the invention the communication platform is provided to remove the mapping upon request, from the service provider application or the radio communication device.

According to one variant of the third aspect of the invention the request for removal of the mapping is sent using a control channel established between the communication platform and each of the service provider application and radio communication device.

Since the radio communication device and service provider application is connected to the communication platform using the control channel, this can be used to take decisions regarding when to remove the UDP mapping in the address translation functionality. The mapping can of course also be removed if either of the control channels are lost.

According to one variant of the invention the communication platform is connected to a dedicated access point. This provide to possibility to not charge for packet data, such as GPRS packet data, but rather for service usage. Thereby a flat-rate charging can be applied The communication platform is provided to set up a mapping for UDP traffic between the service provider application and the radio communication device, when the communication platform detects an UDP message on the communication channel, and is provided to remove any mappings previously set up for UDP traffic when the communication platform registers that the communication channel is closed.

One advantage with the present invention is that an operator of a radio communication network is able to provide a portal having a common interface towards third-party service developers.

Another advantage is that the communication platform makes it possible to provide new kind of services not previously possible to provide to radio communication users.

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 4, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
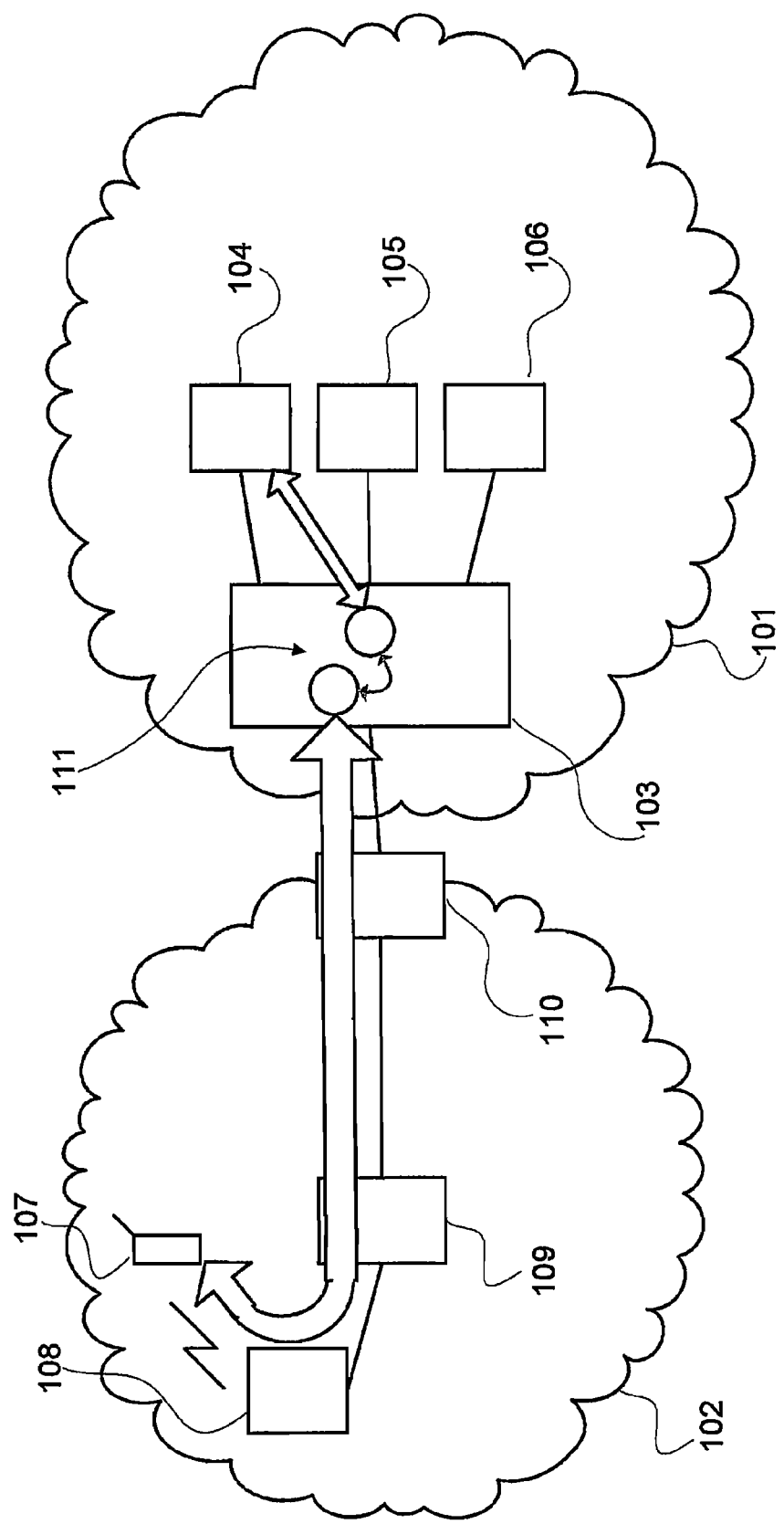
FIG. 1 is a schematic block diagram of one variant of the communication platform according to the invention.

FIG. 1 is a schematic block diagram of a preferred embodiment according to the invention illustrating a first data packet network 101 and a second data packet network 102. In the first network 101 is a communication platform 103, to be further disclosed below, located hosting first, second and third service provider applications denoted 104, 105 and 106 respectively. The service provider applications can each be developed by independent service providers, and will provide different services to radio communication devices located in the second network 102, such as instant messaging and pushing of live content such as sport results and stock quotes. One such radio communication device is shown in FIG. 1 and denoted 107. The radio communication devices in the second network does not commonly have public addresses known to the service provider applications in the first network, but uses private addresses only available in the second network.

The radio communication device 107 is in radio communication with a BTS/BSC 108, which in turn, is connected to a SGSN 109 (Serving Gprs Support Node) for providing GPRS support to the radio communication device 107. The SGSN 109 is connected to a GGSN 110 (Gateway Gprs Support Node). The GGSN acts as a gateway between the second network 102 and other foreign networks, such as the first network 101. Thus, the GGSN 110 acts as a connection point for the communication platform 103 to the second network 102. NAT (Network Address Translation) and firewall functionality is provided between the first and second network according to common techniques, to increase the security in the second network 102.

Session objects 111, to be further described below, provides an interface for the first service provider application 104 towards the radio communication device 107, for two-way communication them between. As is shown in FIG. 1, the communication platform 103 hides the specifics regarding the radio communication device 107, and provides extra services to the service provider application 104, such as QoS (Quality of Service), flow control/transaction security, abstraction of device specific communication capabilities, scaling, load balancing, billing etc, all to be further described below. This means that the service provider, when designing the service provider application 104, need not consider complications such as lost connections, support of different protocols, flow control etc.

Figure 2:
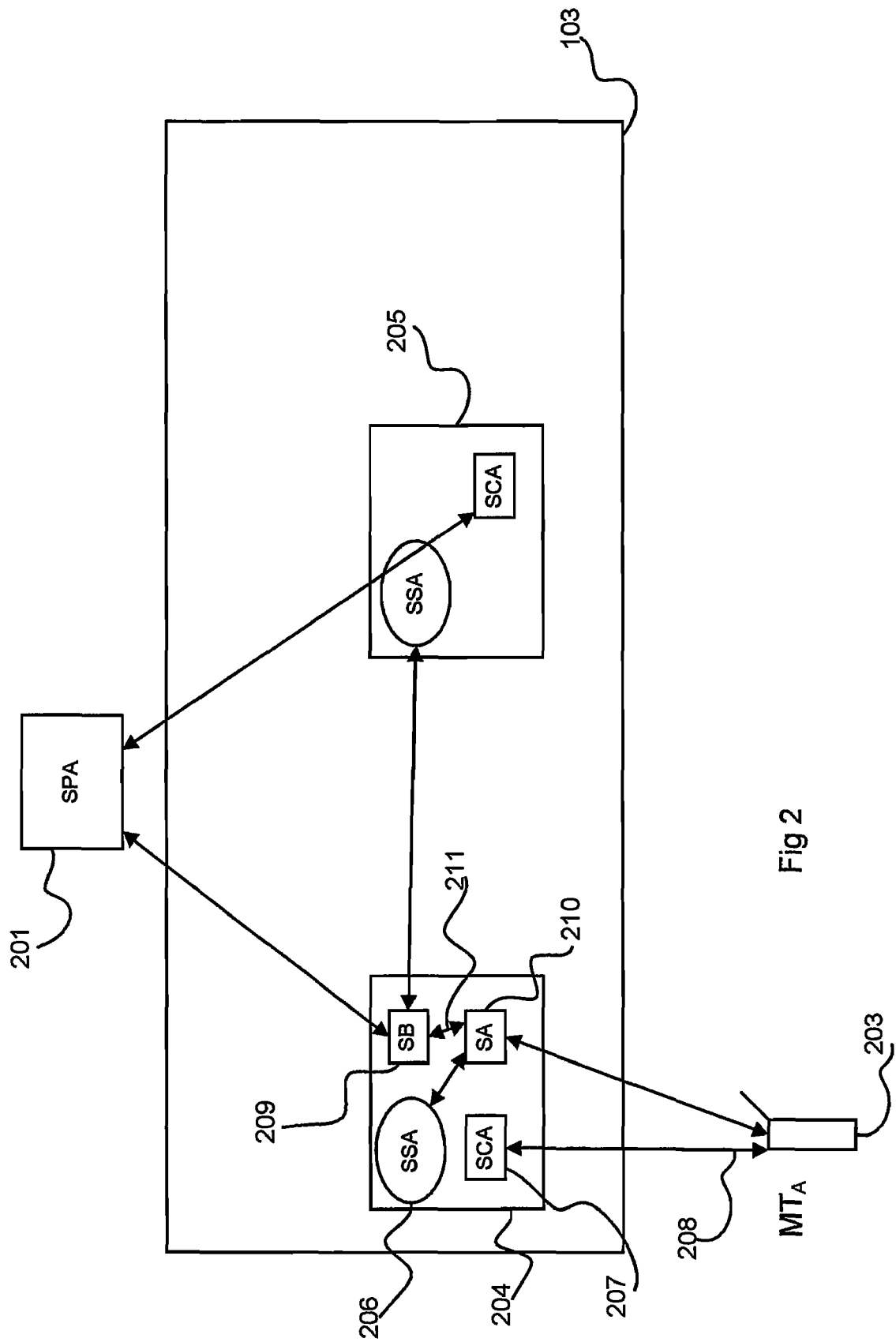
FIG. 2 is a schematic connection diagram of communication connections between a service provider application and a radio communication device according to one variant of the invention.

FIG. 2 is a schematic connection diagram for a communication platform 103 according to a preferred embodiment of the present invention. FIG. 2 disclose communication between a first service provider application 201 and a radio communication device 203, also denoted $MT_A$.

The operation of the communication platform is as follows.

The radio communication device 203, sends a connection request to a first communication platform unit 204. The communication platform 103 also comprises a second communication platform unit 205. The communication platform units may for instance be common computers.

The CPU 204 receiving the connection request from the radio communication device $MT_A$ creates, with a signal, a super-session object 206, denoted SSA, for the $MT_A$. In the signal specific connection details is included, enabling the CPU 204 to send messages to the radio communication device $MT_A$. The SSA generates a unique key, representing the $MT_A$ and stores this key together with a reference to a Session-Control object 207, SCA. The SSA 206 register its process identity in a look up register, such as a DNS, RMI, Corba etc., together with the generated unique key and address information identifying the radio communication device and/or its user, for instance a SIP-address (Session Initiation Protocol). The key is finally sent to the $MT_A$ in an accept message.

Thus, a control channel 208 has been established between the communication platform and the radio communication device 203.

The radio communication device 203 can communicate with the service provider application 201 using data channels 211, 212, and 213. The data channels are set up using the control channels as is disclosed in greater detail in the patent application by the same inventors as the present invention, filed in the same name and at the same date as the present invention, which is hereby incorporated in the present application by reference. The radio device may have several such data channels open simultaneously, communication with several different service provider applications or radio devices. A radio device may thus serve as a service provider application.

Figure 3:
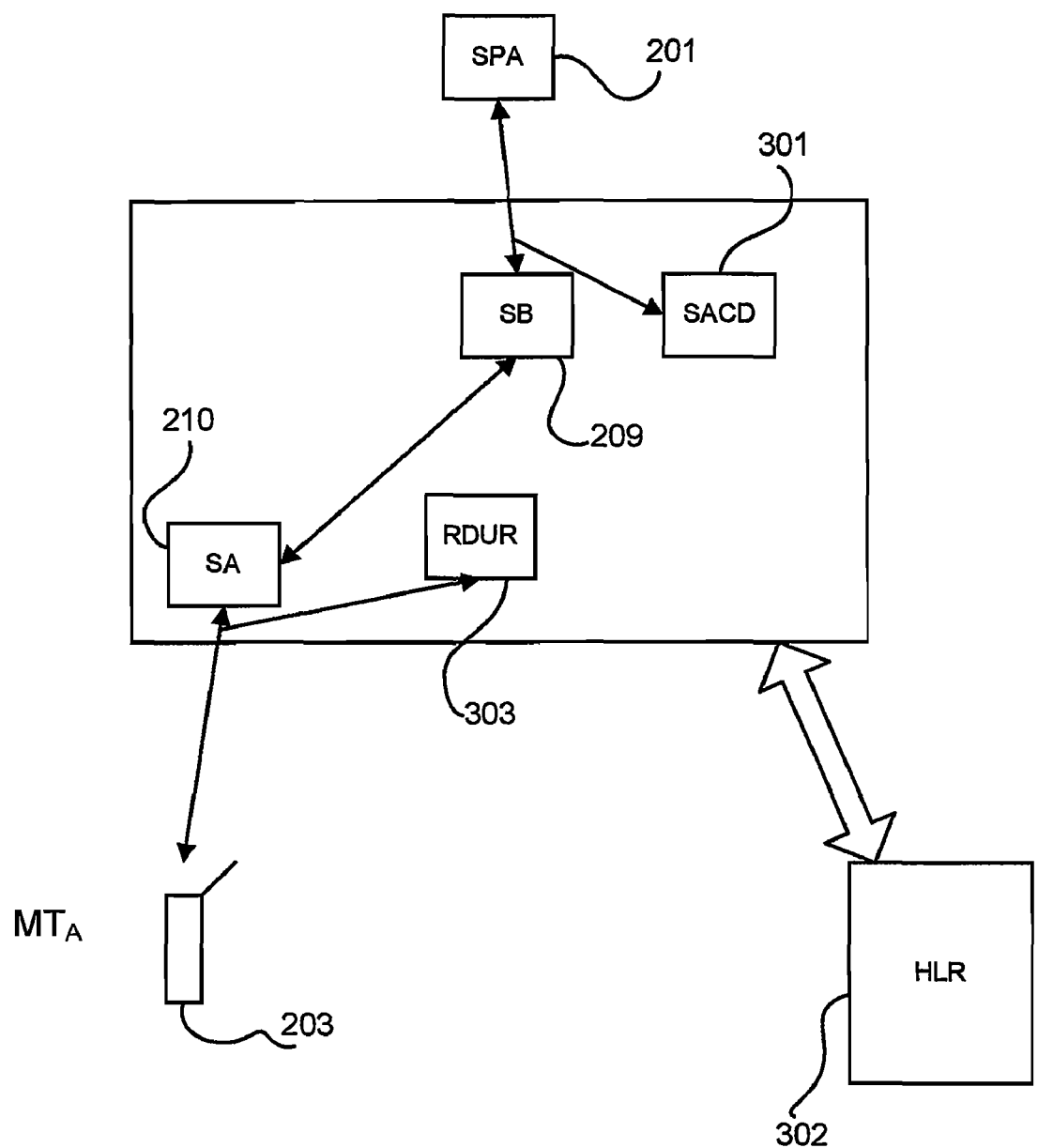
FIG. 3 is a schematic block diagram disclosing the data communication channel between the service provider application and the radio communication device in FIG. 2 in greater detail.

FIG. 3 is a schematic block diagram of the communication channel between the service provider application 201 and the radio communication device 203 in greater detail. As is illustrated in FIG. 3 the communication platform extracts service provider application call details (SACD) 301 from the connection to the service provider. This call details comprises information about the usage of the service provider application including, which service is used, how long time the service is used by the radio communication device 203, amount of data downloaded by the radio device 203, QoS, precedence, delay etc.

Further more the communication platform is connected to a data register in the second network, in this embodiment a home location register, or HLR 302. The HLR 302 comprises information about the radio communication device, such as Mobile Station Information including IMSI and MSISDN, Location information including ISDN number to the VLR and MSC where the radio device is located, Service information including service subscription and service restrictions, SS7 address to the SGSN used by the radio device, IP address to the SGSN used by the radio device, MNRG, a list of nodes disclosing available GGSN, PDP context including: PDP type, PDP address, QoS Profile, VPLMN address, GGSN address for this context, billing records from SGSN and GGSN etc. Selected data from this information together with specific data relating to the communication channel is collected in a radio device user record (RDUR) 303. The RDUR 303 and SACD 301 is related to each other in the platform and a usage record is created comprising information relating to the usage of the service provider application 201 by the radio device 203. This usage record is sent to the HLR, possibly together with tariff information stating the cost for using the service provider application 201, and the radio communication device, or rather the user of the radio communication device 203, could be billed for the usage of the service provider application 201, on his ordinary telephone bill.

Alternatively, the billing information is generated directly at the communication platform, rather than sent to the HLR 302.

Figure 4:
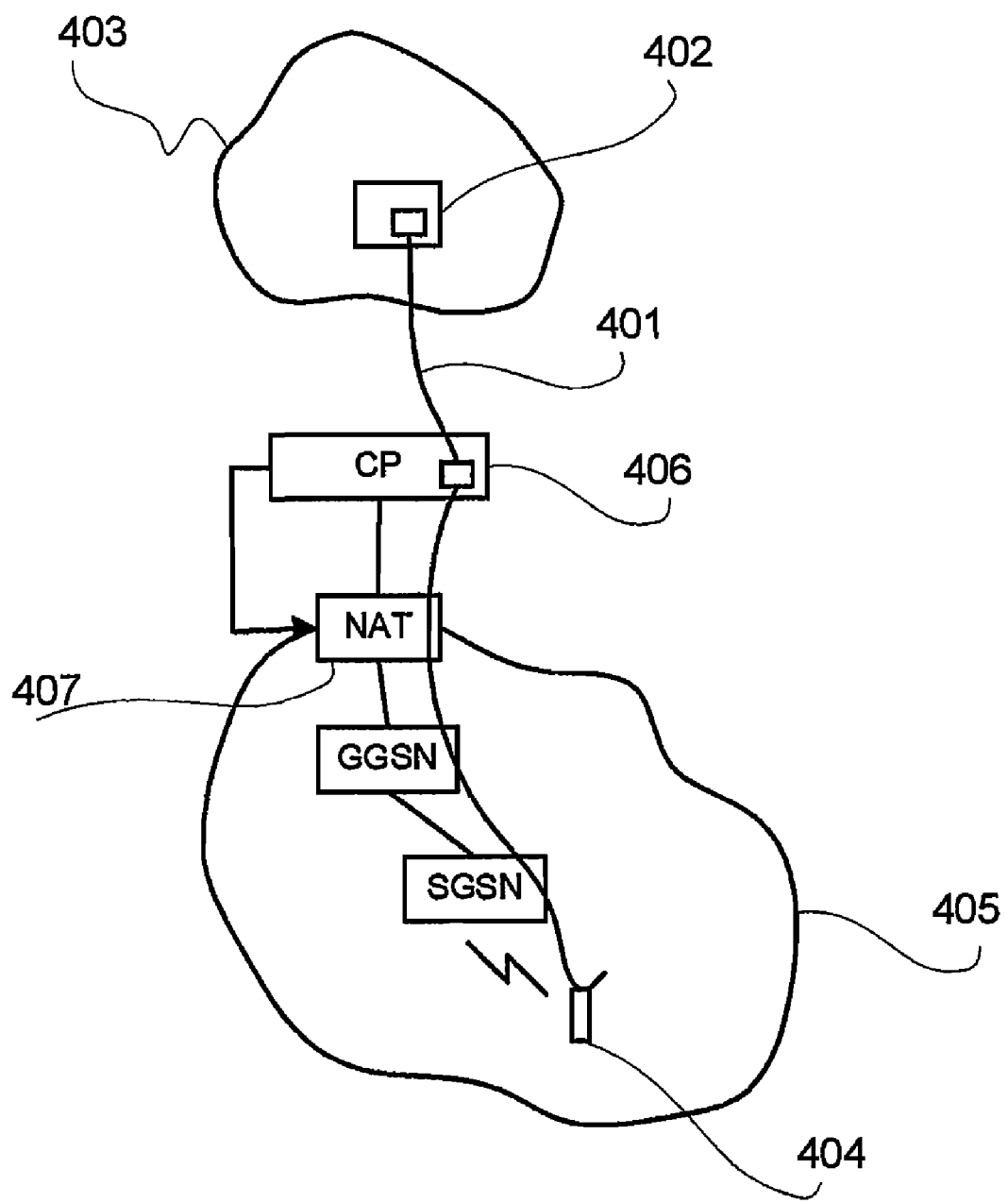
FIG. 4 is a schematic block diagram of TCP and UDP communication between two networks using a variant of the communication platform according to the invention.

FIG. 4 is a schematic flow diagram of a variant of the communication platform according to the invention. A communication channel 401 is set up between a service provider application SPA 402 located in a first network 403 and a radio communication device 404 located in a second network 405 using the communication platform 406. Also disclosed in FIG. 4 is a network address translator device NAT 407. NATs are commonly known and operate to hide the internal addresses in the second network 405. This is performed by mapping public IP-addresses disclosed to the first network 403 to private IP-addresses used in the second network 405. This is possible through use of the TCP protocol which comprise information regarding start and stop of connections, so that the NAT 407 can retrieve information on when to set-up a mapping and when to remove a mapping by analysing the TCP-packages.

The UDP protocol is, however, a state-less protocol and comprises no information regarding when a connection starts or when it stops. The UDP protocol is often used for broadcasting information or streaming. However, since the communication platform 406 comprises information relating to the connection status of the radio communication device, this information can be used to set-up and remove mappings in the NAT 407.

Thus, the communication platform 406 receives a request from a service provider application using the control channel. The communication platform 406 orders the NAT to set-up a mapping for the so requested UDP session. That is, a mapping for the UDP-protocol between a public IP-address and port and a private IP-address and port. The communication platform further monitors the status of the radio communication device 404 and the service provider application 402 and detects if anyone breaks the communication channel. In that case the communication platform orders the NAT to remove the mapping. The communication platform 406 can also be instructed via respective control channels, 208 and 214 in FIG. 2, that the UDP session should be ended. It should be noted that for UDP communication no data channels are set up in the communication platform. The communication platform only orders the NAT to set up and tear down the mapping.

Alternatively, the platform can operate as NAT. This will only work if the communication platform has access to the second network.

Figure 5:
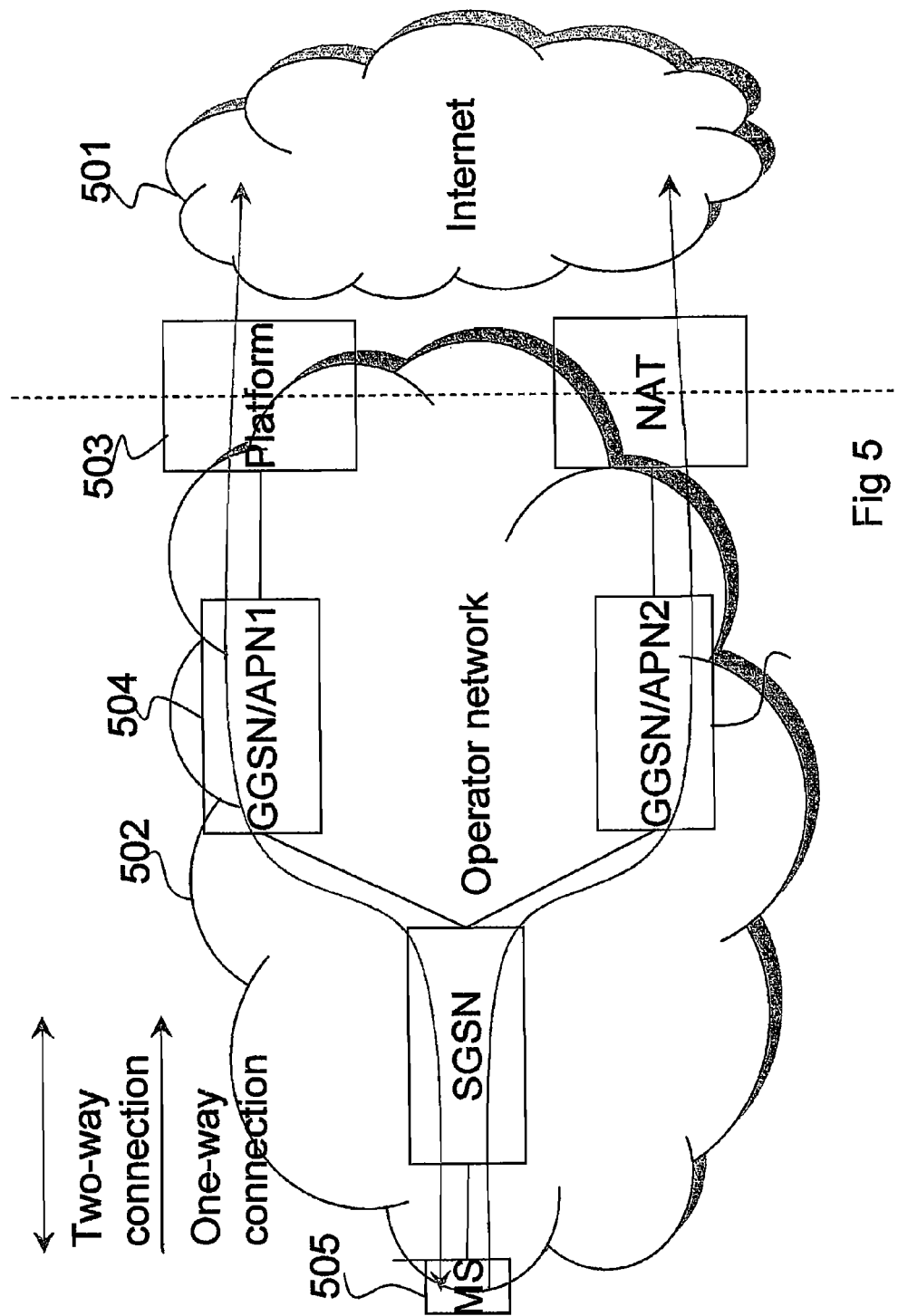
FIG. 5 is a schematic block diagram of the communication platform connected to a dedicated access point in an operator network.

FIG. 5 is a schematic block diagram of a variant according to the present invention for communication between a first network 501, in this embodiment the Internet, and a second network 502. A communication platform 503 according to the invention and described earlier in this text is connected to a first, dedicated access point 504 and provides two-way communication between a radio communication device 505 and the internet. The operator provides at least a further access point 506 for the radio communication device 505 to communication with the Internet. This is a one-way communication since it is not possible for an application on the Internet to reach the radio communication device since it is hidden behind a NAT server 507. Use of a dedicated access point gives the advantages discussed earlier, for instance to use flat rate billing, or to let the communication platform 503 collect billing data etc.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A communication platform for packet communication between at least one service provider in a first network and a radio communication device in a second network, comprising:

said second network that comprises a first network node provided to, at least partly, handle communication between said radio communication device and a gateway located in said second network, wherein said second network further comprises a network address translation functionality for at least translating a set of public IP-addresses, disclosed to said first network, to a set of private IP-addresses used in said second network for TCP-based communication between said first and second networks;

said communication platform is provided to set up a concurrent mapping from said public set of IP-addresses to said set of private IP-addresses for both TCP-based control communication between said first and second networks and UDP-based broadcast communication between said service provider and said radio communication device;

said gateway is provided to handle communication between said second network and said communication platform, and said communication platform is provided to collect first data information relating to said radio communication device, said communication platform is provided to collect second data information relating to a service provider application connected to said radio communication device through said communication platform, and said communication platform is provided to relate said first and second data information to each other to generate a user record specifying usage characteristics for usage of said service provider application by said radio communication device.

2. The communication platform according to claim 1, wherein said communication platform is provided to establish a first communication channel between said radio communication device and said communication platform upon request, said communication platform is provided to establish a second communication channel between said service provider application and said communication platform upon request, said communication platform is provided to relate said first and second communication channels to create a connection between said radio communication device and said service provider application.

3. The communication platform according to claim 1, wherein said communication platform is connected to a data register in said second network.

4. The communication platform according to claim 3, wherein said data register is a Horne Location Register or a Horne Subscriber Server.

5. The communication platform according to claim 3, wherein said communication platform is provided to send said user record to said data register and said data register is provided to use said user record for generating billing information for billing said radio communication device user for the usage of said service provider application.

6. The communication platform according to claim 1, wherein said user record is provided to be used for billing said radio communication device user for the usage of said service provider application.

7. The communication platform according to claim 1, wherein said first data information are data selected from a group of data comprising at least one of:

Mobile Station Information including IMSI and MSISDN,

Location information including ISDN number to a VLR and MSC where said radio communication device is located, Service information including service subscription and service restrictions, SS7 address to the SGSN used by said radio communication device, IP address to an SGSN used by said radio communication device, MNRG, a list of nodes disclosing available GGSN, or a PDP context including: PDP type, PDP address, QoS Profile, VPLMN address, and GGSN address.

8. The communication platform according to claim 1, wherein said second data information are data selected from a group of data comprising at least one of: service provider application identity, connection time, log on time, log off time, number of packets sent, number of packets received, socket ID, IP-address, QoS, downloaded files, and visited pages.

9. A method for packet communication between a service provider located in a first network and a radio communication device in a second network, comprising the actions of:

enabling said second network to comprise a first network node provided to, at least partly, handle communication between said radio communication device and a gateway, and said gateway is provided for handling communication between said first network node and said first network, wherein said second network further comprises a network address translation functionality for at least translating a set of public IP-addresses, disclosed to said first network, to a set of private IP-addresses used in said second network for TCP-based communication between said first and second networks;

enabling a communication platform to set up a concurrent mapping from said public set of IP-addresses to said set of private IP-addresses for both TCP-based control communication between said first and second networks and UDP-based broadcast communication between said service provider and said radio communication device;

collecting first data information relating to said radio communication device, collecting second data information relating to a service provider application connected to said radio communication device, relating said first data information to said second data information, and generating a user record specifying usage characteristics for usage of said service provider application by said radio communication device.

10. The method according to claim 9, further comprising the further steps of:

receiving a request for a communication channel between said radio communication device and said communication platform, establishing a first communication channel between said radio communication device and said communication platform, receiving a request for a communication channel between said communication platform and said service provider application, establishing a second communication channel between said communication platform and said service provider application, and relating said first communication channel to said second communication channel to create a connection between said radio communication device and said service provider application.

11. The method according to claim 9, wherein said communication platform is connected to a data register located in said second network, and comprising the steps of: sending said user record to said data register, and using said user record to generate billing information for billing a user of said radio communication device for usage of said service provider application.

12. The method according to claim 9, wherein said first data information are data selected from a group of data comprising at least one of:

Mobile Station Information including IMSI and MSISDN,

Location information including ISDN number to a VLR and MSC where said radio communication device is located, Service information including service subscription and service restrictions, SS7 address to a SGSN used by said radio communication device, IP address to said SGSN used by said radio communication device, MNRG,
a list of nodes disclosing available GGSN, and
PDP context including: PDP type, PDP address, QoS Profile, VPLMN address, and GGSN address.

13. The method according to claim 9, wherein said first data information are data selected from a group of data comprising at least one of: service provider application identity, connection time, log on time, log off time, number of packets sent, number of packets received, socket ID, IP-address, QoS, downloaded files, and visited pages.

14. A communication platform for packet communication between at least one service provider in a first network and a radio communication device in a second network, comprising:
    said second network that comprises a first network node provided to, at least partly, handle communication between said radio communication device and a gateway located in said second network, wherein said second network comprises a network address translation functionality translating a set of public IP-addresses, disclosed to said first network, to a set of private IP-addresses used in said second network for TCP-based communication between said first and second networks;
    wherein said communication platform is provided to receive a request for UDP-based broadcast communication from a service provider application located in said first network to said radio communication device in said second network; and
    wherein said communication platform is provided to set up a concurrent mapping from said public set of IP-addresses to said set of private IP-addresses for both TCP-based control communication between said first and second networks and UDP-based broadcast communication between said service provider application and said radio communication device in said network address translation functionality.

15. The communication platform according to claim 14, wherein said communication platform is provided to receive said request using a control channel established between said service provider application and said communication platform.

16. The communication platform according to claim 14, wherein
    said communication platform is provided to remove said mapping upon request from said service provider application or said radio communication device.

17. The communication platform according to claim 16, wherein
    said request for removal of said mapping is sent using a control channel established between said communication platform and each of said service provider application and radio communication device.

* * * * *

UNITED STATES PATENT AND TRADEMARK OFFICE
CERTIFICATE OF CORRECTION

| | | |
|---|---|---|
| PATENT NO. | : 8,009,610 B2 | Page 1 of 1 |
| APPLICATION NO. | : 11/571396 | |
| DATED | : August 30, 2011 | |
| INVENTOR(S) | : Andreas Nordin et al. | |

It is certified that error appears in the above-identified patent and that said Letters Patent is hereby corrected as shown below:

In column 9, line 31, in Claim 4, after "is" delete "a Horne" and insert -- a Home --, therefor.

Signed and Sealed this
Twenty-ninth Day of November, 2011

David J. Kappos
*Director of the United States Patent and Trademark Office*